United States Patent Office 3,466,330
Patented Sept. 9, 1969

3,466,330
2,3-DIAMINO-5,8-ALKANO-5,6,7,8-TETRAHYDRO-NAPHTHALENE COMPOUNDS
Hiroshi Tanida, Osaka-shi, and Ryonosuke Muneyuki, Itami-shi, Japan, assignors to Shionogi & Co., Ltd., Higashi-ku, Osaka-shi, Osaka, Japan
No Drawing. Original application Jan. 22, 1965, Ser. No. 427,470, now Patent No. 3,336,331, dated Aug. 15, 1967. Divided and this application Apr. 25, 1967, Ser. No. 647,270
Claims priority, application Japan, Jan. 24, 1964, 39/3,392, 39/3,393
Int. Cl. C07c 87/66
U.S. Cl. 260—578        3 Claims

ABSTRACT OF THE DISCLOSURE 2,3 - diamino - 5,8 - alkano - 5,6,7,8 - tetrahydronaphthalene compounds are provided herein, wherein the alkano group may be a methano or an ethano group. These compounds are useful as intermediates in the production of the corresponding 5,8-alkano-5,6,7,8-tetrahydro-1H-naphtho[2,3-d]imidazole compounds; the latter compounds being useful as analgesics.

---

The present application is a divisional application of copending application Ser. No. 427,470, filed Jan. 22, 1965, now U.S. Patent No. 3,336,331.

The present invention relates to 5,8-alkano-5,6,7,8-tetrahydro-1H-naphtho[2,3-d]imidazoles and production thereof. More particularly, it relates to 5,8-alkano-5,6,7,8-tetrahydro-1H-naphtho[2,3-d)imidazoles represented by the formula:

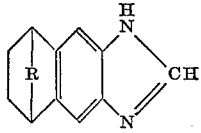

(I)

where R is methylene or ethylene, which are useful as analgesic agents, and production thereof.

Accordingly, it is an object of the present invention to embody 5,8-alkano-5,6,7,8-tetrahydro-1H-naphtho[2,3-d]imidazoles (I). Another object of this invention is to embody 5,8 - alkano - 5,6,7,8 - tetrahydro - 1H - naphtho-[2,3-d]imidazoles (I) useful as anelgesic agents. A further object of the invention is to embody a process for preparing 5,8 - alkano - 5,6,7,8 - tetrahydro - 1H - naphtho[2,3-d]imidazoles (I). These and other objects will be apparent to those conversant with the art to which the present invention pertains from the subsequent description.

According to the present invention, the objective 5,8-alkano - 5,6,7,8 - tetrahydro - 1H - naphtho[2,3-d]imidazole (I) is prepared by nitrating the corresponding 5,8-alkano-5,6,7,8-tetrahydronaphthalene represented by the formula:

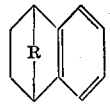

(II)

wherein R has the same significance as designated above, reducing the resulting 2,3-dinitro-5,8-alkano-5,6,7,8-tetrahydronaphthalene represented by the formula:

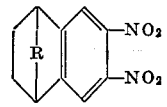

(III)

wherein R has the same significance as designated above and reacting the resultant 2,3-diamino-5,8-alkano-5,6,7,8-tetrahydronaphthalene represented by the formula:

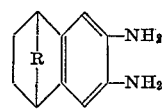

(IV)

wherein R has the same significance as designated above with formic acid.

The starting 5,8-alkano-5,6,7,8-tetrahydronaphthalene (II) is known and can be prepared, for instance, by reacting cyclopentadiene or 1,3-cyclohexadiene with benzyne according to the Diels Alder reaction and hydrogenating the resultant 5,8 - alkano - 5,8 - dihydronaphthalene [H. E. Simmons: J. Am. Chem. Soc., 83, p. 1657 (1961)].

The 5,8-alkano-5,6,7,8-tetrahydronaphthalene (II) is first nitrated to the 2,3-dinitro-5,8-alkano-5,6,7,8-tetrahydronaphthalene (III). The nitration may be effected by treating the 5,8-alkano-5,6,7,8-tetrahydronaphthalene (II) with a conventional nitrating agent such as a mixture of nitric acid and sulfuric acid, a mixture of nitric acid and acetic anhydride, a mixture of an alkali nitrate and sulfuric acid or benzoyl nitrate, if necessary, in an inert solvent (e.g. acetic acid, nitromethane, nitrobenzene, chloroform, carbon tetrachloride). Depending on the used nitrating agent, there may be obtained as a main product not the 2,3-dinitro-5,8-alkano-5,6,7,8-tetrahydronaphthalene (III) but the 2-nitro-5,8-alkano-5,6,7,8-tetrahydronaphthalene represented by the formula:

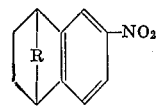

(III')

wherein R has the same significance as designated above. The 2-nitro - 5,8-alkano - 5,6,7,8-tetrahydronaphthalene (III') can be readily nitrated to the 2,3-dinitro-5,8-alkano-5,6,7,8-tetrahydronaphthalene (III) by treating again with the said nitrating agent. The resulting 2,3-dinitro-5,8-alkano-5,6,7,8-tetrahydronaphthalene (III) is then subjected to reduction to give the 2,3-diamino-5,8-alkano-5,6,7,8-tetrahydronaphthalene (IV). For the reduction, there may be adopted such a conventional procedure for converting a nitro group into an amino group as reduction using a metal (e.g. zinc, iron, tin) with an acid or alkali, reduction using a metal hydride complex (e.g. lithium aluminum hydride), catalytic reduction using a catalyst (e.g. Raney nickel, platinum dioxide) or electrolytic reduction. The resultant 2,3-diamino-5,8-alkano-5,6,7,8-tetrahydronaphthalene (IV) is then reacted with formic acid to give the objective 5,8-alkano-5,6,7,8-tetrahydro-1H-naphtho[2,3-d]-imidazole (I). The reaction may be usually carried out at room temperature (10 to 30° C.) or while heating on a water bath.

The thus obtained 5,8-alkano-5,6,7,8-tetrahydro-1H-naphtho[2,3-d]imidazoles (I) are useful as analgesic agents. For instance, 5,8-methano-5,6,7,8-tetrahydro-1H-naphtho[2,3-d]-imidazole (I: R=CH$_2$) exhibits much higher analgesic activity with lower toxicity than aminopyrine (4-dimethylamino-2,3-dimethyl-1-phenyl-3-pyrazolin-5-one) in the test using mice, as shown in the following table:

TABLE

| | Compound | |
|---|---|---|
| | 5,8-methano-5,6,7,8-tetrahydro-1H-naphtho-[2,3-d]imidazole | Aminopyrine |
| Analgesic activity ED$_{50}$(mg./kg.)[1] | 33 | 86 |
| Acute toxicity LD$_{50}$ (mg./kg.)[2] | 1,000 | 335 |

[1] As test animals, there were used groups of white albino mice weighing from 15 to 17.5 grams, each group consisting of 10 mice. Test animals were intraperitoneally treated with a certain amount of the test compound and 3.5 milligrams of morphine per kilogram of body weight. After 30 minutes, the tail was pinched with a forceps for observation of flick. From the percentage of mice showing analgesia, the effective dose 50(ED$_{50}$) was calculated by the Bliss method.

[2] As test animals, there were used groups of white albino mice weighing from 15 to 17 grams, each group consisting of 20 mice. Each group of animals was subcutaneously treated with a certain amount of the test compound and observed for 24 hours after the treatment. The lethal dose 50 (LD$_{50}$) was calculated by graphic interpolation from two doses actually used, one of which killed less than half and the other more than half the number of mice treated (Schleicher and Schull probability graph paper 298½ was used for the graphic interpolation). 5,8-ethano-5,6,7,8 tetrahydro-1H-naphtho[2,3-d]imidazole (I: R=CH$_2$CH$_2$) also shows the similar activity. Still, it may be noted that these compounds inhibit NF sarcoma in mice.

Present-preferred embodiments of the present invention are shown in the following examples. The relationship of parts by weight to parts by volume is the same as that between grams and milliliters. Temperatures are set forth in degrees centigrade.

EXAMPLE 1

A. Preparation of 2,3-dinitro-5,8-methano-5,6,7,8-tetrahydronaphthalene

To a solution of 5,8-methano-5,6,7,8-tetrahydronaphthalene (17.0 parts by weight) in 80% sulfuric acid (45 parts by weight), there is added portionwise fuming nitric acid ($d=1.5$) (7.9 parts by weight) while cooling at 8 to 10° C., and the resultant mixture is stirred for 1.5 hours while cooling with ice-water. Further stirring is continued at room temperature (10 to 30° C.) for 1.5 hours. The reaction mixture is poured onto ice-water and shaken with ether. The ether layer is washed with water and 5% sodium bicarbonate solution in order, dried over anhydrous sodium sulfate and the solvent evaporated. The residue is distilled under reduced pressure to give a fraction (18.3 parts by weight) boiling at 148 to 151° C./7.0 mm. Hg. The fraction is chromatographed on alumina to give 2-nitro-5,8-methano-5,6,7,8-tetrahydronaphthalene (8.2 parts by weight) as an oil boiling at 140 to 142° C./6.0 mm. Hg, $n_D^{26}=1.5855$. The oil (2.8 parts by weight) is dissolved in 90% sulfuric acid (50.0 parts by weight) and potassium nitrate (1.6 parts by weight) portionwise added thereto at 50 to 60° C. The resultant mixture is stirred at 60° C. for 1 hour. The reaction mixture is poured onto ice water and shaken with ether. The ether layer is washed with water and 5% sodium bicarbonate solution in order, dried over anhydrous sodium sulfate and the solvent evaporated. The residue is crystallized from ether to give 2,3-dinitro-5,8-methano-5,6,7,8-tetrahydronaphthalene (2.1 parts by weight) as crystals melting at 146.7 to 147.2° C.

B. Preparation of 2,3-diamino-5,8-methano-5,6,7,8-tetrahydronaphthalene

To a solution of 2,3-dinitro-5,8-methano-5,6,7,8-tetrahydronaphthalene (1.0 part by weight) in ethanol-2 (50.0 parts by volume), there is added platinum dioxide (0.1 part by weight), and hydrogen gas is introduced into the resultant mixture while shaking. After hydrogen gas (650 parts by volume) is absorbed in 1.5 hours, the resultant mixture is filtered to remove the catalyst and concentrated under reduced pressure to give 2,3-diamino-5,8-methano-5,6,7,8-tetrahydronaphthalene (0.8 part by weight) as a yellow solid.

C. Preparation of 5,8-methano-5,6,7,8-tetrahydro-1H-naphtho[2,3-d]imidazole 2,3-diamino-5,8-methano-5,6,7,8-tetrahydronaphthalene (0.8 part by weight) is combined with formic acid (5.0 parts by volume) and heated on a steam bath for 2 hours. The reaction mixture is poured onto ice, made alkaline with sodium carbonate and shaken with ether. The ether layer is washed with water, dried over anhydrous sodium sulfate and the solvent evaporated. The residue is crystallized from benzene to give 5,8-methano-5,6,7,8-tetrahydro-1H-naphtho[2,3-d]imidazole (0.5 part by weight) as crystals melting at 198.5 to 199.5° C.

EXAMPLE 2

A. Preparation of 2,3-dinitro-5,8-methano-5,6,7,8-tetrahydronaphthalene

To a solution of 5,8-methano-5,6,7,8-tetrahydronaphthalene (0.7 part by weight) in nitromethane (20.0 parts by volume), there is added portionwise a mixture of fuming nitric acid ($d=1.5$) (2.5 parts by weight) and conc. sulfuric acid (77.0 parts by weight) while cooling at 2 to 4° C., and the resultant mixture is stirred at room temperature (10 to 30° C.) for 2 hours. The reaction mixture is poured onto ice-water and shaken with ether. The ether layer is washed with water and 5% sodium bicarbonate solution in order, dried over anhydrous sodium sulfate and the solvent evaporated. The residue is distilled under reduced pressure to give a fraction (0.7 part by weight) boiling at 148 to 151° C./7.0 mm. Hg. The fraction is chromatographed on alumina to give 2-nitro-5,8-methano-5,6,7,8-tetrahydronaphthalene (0.6 part by weight) as an oil boiling at 140 to 142° C./6.0 mm. Hg. The oil (0.6 part by weight) is dissolved in 90% sulfuric acid (12.2 parts by weight) and potassium nitrate (0.4 parts by weight) portionwise added thereto at 50 to 60° C. The resultant mixture is stirred at 60° C. for 1 hour. The reaction mixture is poured onto ice water and shaken with ether. The ether layer is washed with water and 5% sodium bicarbonate solution in order, dried over anhydrous sodium sulfate and the solvent evaporated. The residue is crystallized from ether to give 2,3-dinitro-5,8-methano-5,6,7,8-tetrahydronaphthalene (0.5 part by weight) as crystals melting at 146.7 to 147.2° C.

B. Preparation of 2,3-diamino-5,8-methano-5,6,7,8-tetrahydronaphthalene 2,3-dinitro-5,8-methano-5,6,7,8-tetrahydronaphthalene is catalytically reduced to 2,3-diamino-5,8-methano-5,6,7,8-tetrahydronaphthalene in the same manner as in Example 1B.

C. Preparation of 5,8-methano-5,6,7,8-tetrahydro-1H-naphtho[2,3-d]imidazole 2,3-diamino-5,8-methano-5,6,7,8-tetrahydronaphthalene is reacted with formic acid in the same manner as in Example 1C to give 5,8-methano-5,6,7,8-tetrahydro-1H-naphtho[2,3-d]imidazole.

EXAMPLE 3

A. Preparation of 2,3-dinitro-5,8-methano-5,6,7,8-tetrahydronaphthalene

To a solution of 5,8-methano-5,6,7,8-tetrahydronaphthalene (6.0 parts by weight) in nitromethane (60.0 parts by volume), there is added portionwise a mixture of fuming nitric acid (9.6 parts by weight) and conc. sulfuric acid (38.5 parts by weight) while cooling around 10° C. and the resultant mixture is stirred at room temperature (10 to 30° C.) for 1 hour. Further stirring is continued at 40° C. for 40 minutes. The reaction mixture is poured onto ice and shaken with ether. The ether layer is washed with water and 5% sodium bicarbonate solution in order, dried over anhydrous sodium sulfate and the solvent evaporated. The residue is crystallized from ethanol to give 2,3-dinitro-5,8 - methano - 5,6,7,8 - tetrahydronaphthalene (6.4 parts by weight) as crystals melting at 146.7 to 147.2° C.

B. Preparation of 2,3-diamino-5,8-methano-5,6,7,8-tetrahydronaphthalene 2,3-dinitro-5,8-methano-5,6,7,8 - tetrahydronaphthalene is catalytically reduced to 2,3-diamino-5,8-methano-5,6,7,8-tetrahydronaphthalene in the same manner as in Example 1B.

C. Preparation of 5,8-methano-5,6,7,8-tetrahydro-1H-naphtho[2,3-d]imidazole 2,3-diamino-5,8-methano - 5,6,7,8 - tetrahydronaphthalene is reacted with formic acid in the same manner as in Example 1C to give 5,8-methano-5,6,7,8-tetrahydro-1H-naphtho[2,3-d]imidazole.

EXAMPLE 4

A. Preparation of 2,3-dinitro-5,8-ethano-5,6,7,8-tetrahydronaphthalene

To a solution of 5,8-ethano-5,6,7,8-tetrahydronaphthalene (6.1 parts by weight) in nitromethane (250.0 parts by volume), there is added portionwise a mixture of fuming nitric acid ($d=1.5$) (2.7 parts by weight) and conc. sulfuric acid (74.5 parts by weight) while cooling with ice, and the resultant mixture is stirred at 0 to 4° C. for 1 hour. The reaction mixture is poured onto ice and shaken with ether. The ether layer is washed with water and 5% sodium bicarbonate solution in order, dried over anhydrous sodium sulfate and the solvent evaporated. The residue is distilled under reduced pressure to give a fraction (6.9 parts by weight) boiling at 140° C./1.0 mm. Hg. The fraction is treated with methanol to give 2-nitro-5,8-ethano-5,6,7,8-tetrahydronaphthalene (5.7 parts by weight) as crystals melting at 71° C. The crystals (1.0 part by weight) are dissolved in nitromethane (20.0 parts by volume), and a mixture of fuming nitric acid ($d=1.5$) (2.5 parts by weight) and conc. sulfuric acid (77.1 parts by weight) is added thereto while cooling at 2 to 4° C. The resultant mixture is stirred at the same temperature for 1.5 hours. The reaction mixture is poured onto ice water and shaken with ether. The ether layer is washed with water and 5% sodium bicarbonate solution in order, dried over anhydrous sodium sulfate and the solvent evaporated. The residue is crystallized from methanol to give 2,3-dinitro-5,8-ethano-5,6,7,8 - tetrahydronaphthalene (0.6 part by weight) as crystals melting at 157 to 158° C.

B. Preparation of 2,3-dinitro-5,8-ethano-5,6,7,8-tetrahydronaphthalene

To a solution of 2,3-dinitro-5,8-ethano-5,6,7,8-tetrahydronaphthalene (1.4 parts by weight) in ethanol-acetate (30.0 parts by volume) there is added platinum dioxide (0.1 part by weight), and hydrogen gas is introduced into the resultant mixture while shaking. After hydrogen gas (760 parts by volume) is absorbed in 1.5 hours, the reaction mixture is filtered to remove the catalyst and concentrated under reduced pressure to give 2,3-diamino-5,8-ethano-5,6,7,8-tetrahydronaphthalene (1.1 parts by weight) as a yellow solid.

C. Preparation of 5,8-ethano-5,6,7,8-tetrahydro-1H naphtho[2,3-d]imidazole 2,3-diamino-5,8-ethano-5,6,7,8 - tetrahydronaphthalene (1.1 parts by weight) is combined with formic acid (10.0 parts by volume) and heated on a steam bath for 2 hours. The reaction mixture is poured onto ice, made alkaline with sodium carbonate and shaken with ether. The ether layer is washed with water, dried over anhydrous sodium sulfate and the solvent evaporated. The residue is crystallized from benzene to give 5,8-ethano-5,6,7,8-tetrahydro-1H-naphtho[2,3-d]imidazole (0.9 part by weight) as crystals melting at 227 to 228° C.

What is claimed is:

1. 2,3-diamino-5,8-alkano-5,6,7,8 - tetrahydronaphthalene of the formula:

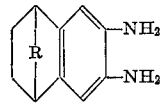

wherein R is a member selected from the group consisting of methylene and ethylene.

2. 2,3-diamino-5,8-methano-5,6,7,8 - tetrahydronaphthalene.

3. 2,3-diamino-5,8-ethano-5,6,7,8 - tetrahydronaphthalene.

References Cited

UNITED STATES PATENTS 3,337,578 8/1967 Bader et al. _____ 260—578 X
3,347,870 10/1967 Rutschmann et al. \_\_ 260—578 X CHARLES B. PARKER, Primary Examiner R. L. RAYMOND, Assistant Examiner U.S. Cl. X.R.

260—309.2, 645, 668, 999